(12) United States Patent
Imai et al.

(10) Patent No.: US 12,504,275 B2
(45) Date of Patent: Dec. 23, 2025

(54) PARTS SUPPLY DEVICE AND PARTS TRANSFER SYSTEM

(71) Applicants: KYOTO SEISAKUSHO CO., LTD., Kyoto (JP); CHUGAI SEIYAKU KABUSHIKI KAISHA, Tokyo (JP)

(72) Inventors: Yuta Imai, Kyoto (JP); Hiroaki Higashi, Kyoto (JP); Hideaki Hosaka, Tokyo (JP)

(73) Assignees: KYOTO SEISAKUSHO CO., LTD., Kyoto (JP); CHUGAI SEIYAKU KABUSHIKI KAISHA, Tokyo (JP)

( * ) Notice: Subject to any disclaimer, the term of this patent is extended or adjusted under 35 U.S.C. 154(b) by 90 days.

(21) Appl. No.: 17/756,757

(22) PCT Filed: Dec. 8, 2020

(86) PCT No.: PCT/JP2020/045716
§ 371 (c)(1),
(2) Date: Jun. 1, 2022

(87) PCT Pub. No.: WO2021/117734
PCT Pub. Date: Jun. 17, 2021

(65) Prior Publication Data
US 2023/0003513 A1 Jan. 5, 2023

(30) Foreign Application Priority Data
Dec. 11, 2019 (JP) .................................. 2019-223874

(51) Int. Cl.
G01B 11/24 (2006.01)
B65G 47/90 (2006.01)
G01B 11/06 (2006.01)

(52) U.S. Cl.
CPC ........... *G01B 11/24* (2013.01); *G01B 11/0608* (2013.01); *G01B 11/2441* (2013.01); *B65G 47/90* (2013.01); *B65G 2203/0241* (2013.01)

(58) Field of Classification Search
CPC ..... G01B 11/02; G01B 11/026; G01B 11/028; G01B 11/04; G01B 11/043; G01B 11/046;
(Continued)

(56) References Cited

U.S. PATENT DOCUMENTS 5,311,977 A    5/1994  Dean et al.
6,380,503 B1 * 4/2002  Mills ....................... B07C 5/342
                                                      209/579
(Continued)

FOREIGN PATENT DOCUMENTS

JP    H04-283052    10/1992
JP    H05-056828 U   7/1993
(Continued)

OTHER PUBLICATIONS

International Search Report of PCT/JP2020/045716, Feb. 2, 2021, 3 pages.
(Continued)

*Primary Examiner* — Dominic J Bologna
*Assistant Examiner* — Jonathon Cook
(74) *Attorney, Agent, or Firm* — HSML P.C.

(57) ABSTRACT

A parts supply device includes a stage having a placement surface on which a plurality of parts is placed, an imaging system configured to image the plurality of parts from an obliquely upward direction with respect to the placement surface of the stage, and a parts detection unit configured to detect positions and orientations of the plurality of parts on the placement surface of the stage based on image information obtained by the imaging system.

19 Claims, 9 Drawing Sheets

(58) Field of Classification Search
CPC ..... G01B 11/06; G01B 11/0608; G01B 11/24; G01B 11/2441; G01B 11/2518; B65G 47/90; B65G 2203/0241
See application file for complete search history.

(56) References Cited

U.S. PATENT DOCUMENTS

| | | | | |
|---|---|---|---|---|
| 6,795,200 | B1* | 9/2004 | Barman | G01B 11/022 356/606 |
| 7,313,464 | B1* | 12/2007 | Perreault | B25J 9/1666 700/262 |
| 7,435,046 | B2* | 10/2008 | Kiaie | G11B 17/26 414/223.01 |
| 8,929,642 | B2* | 1/2015 | Ichimaru | G01B 11/2518 356/309 |
| 11,105,607 | B2* | 8/2021 | Weston | G01B 11/2527 |
| 11,667,036 | B2* | 6/2023 | Tonogai | H04N 23/72 700/258 |
| 2012/0194651 | A1* | 8/2012 | Kanto | G06T 7/571 348/E13.074 |
| 2012/0307260 | A1* | 12/2012 | Keshavmurthy | G01B 11/2513 356/601 |
| 2014/0067126 | A1* | 3/2014 | Watanabe | G06T 7/75 382/103 |
| 2014/0098223 | A1* | 4/2014 | Murata | G01B 11/026 348/135 |
| 2018/0299260 | A1* | 10/2018 | Nakamura | B23K 26/032 |
| 2019/0193945 | A1* | 6/2019 | Schroader | B65G 43/08 |
| 2019/0308325 | A1* | 10/2019 | Higo | B65B 59/02 |
| 2020/0174154 | A1* | 6/2020 | Parmee | G01V 5/224 |
| 2020/0242793 | A1* | 7/2020 | Fernandez-Dorado | G01B 11/26 |
| 2021/0268659 | A1* | 9/2021 | Olmstead | B25J 9/1697 |
| 2021/0292098 | A1* | 9/2021 | Murray | B65G 43/08 |
| 2022/0408619 | A1* | 12/2022 | Yamazaki | B65G 47/14 |

FOREIGN PATENT DOCUMENTS

| | | |
|---|---|---|
| JP | H06-040545 | 2/1994 |
| JP | H06-298335 | 10/1994 |
| JP | 08002655 A * | 1/1996 |
| JP | H08-002655 | 1/1996 |
| JP | H09-166426 | 6/1997 |

OTHER PUBLICATIONS

Office Action was issued for the corresponding Swiss patent application No. CH000730/2022, Jun. 13, 2023, 46 pages including English translation of the Office Action.
International Preliminary Report on Patentability of PCT/JP2020/045716, Jun. 23, 2022, 8 pages.
Office Action issued for Japanese Patent Application No. 2021-563979, Apr. 4, 2023, 16 pages including machine translation.

* cited by examiner

PARTS SUPPLY DEVICE AND PARTS TRANSFER SYSTEM

TECHNICAL FIELD

The present disclosure relates to a parts transfer system including a transfer device such as a transfer robot that picks and transfers a part, and a parts supply device that is a component of the parts transfer system and supplies parts to the transfer device.

BACKGROUND ART

For example, there is known a device such as a parts feeder that arranges parts in an aligned orientation (posture) so that a transfer device such as a transfer robot can appropriately pick a part out of the parts. For example, in a case of a device described in Patent Literature 1, a plurality of parts is transferred onto a placement surface of a stage, and engage partially in a plurality of linear grooves formed on the placement surface, so that orientations of the parts are aligned.

PRIOR ART DOCUMENT

Patent Document

[Patent Literature 1] JP H5-56828 U

SUMMARY OF THE INVENTION

Problems to be Solved by the Invention

However, in the case of the device described in Patent Literature 1, when each part has, for example, a bottomed cylindrical shape, some of the plurality of parts on the placement surface of the stage may be different in opening direction by 180 degrees. Thus, a transfer device such as a transfer robot that picks a part out of the parts may picks a part in an incorrect orientation.

Therefore, an object of the present disclosure is to pick a part more reliably in a correct orientation.

Means for Solving the Problems

In order to solve the above technical problems, according to one aspect of the present disclosure, provided is
a parts supply device including:
a stage having a placement surface on which a plurality of parts is placed;
an imaging system configured to image the plurality of parts from an obliquely upward direction with respect to the placement surface of the stage; and
a parts detection unit configured to detect positions and orientations of the plurality of parts on the placement surface of the stage based on image information obtained by the imaging system.

According to another aspect of the present disclosure, provided is
a parts transfer system including:
the parts supply device according to the one aspect of the present disclosure; and
a transfer device configured to pick and transfer a part.

Effects of the Invention

According to the present disclosure, it is possible to pick a part more reliably in a correct orientation.

MODES FOR CARRYING OUT THE INVENTION

Figure 1:
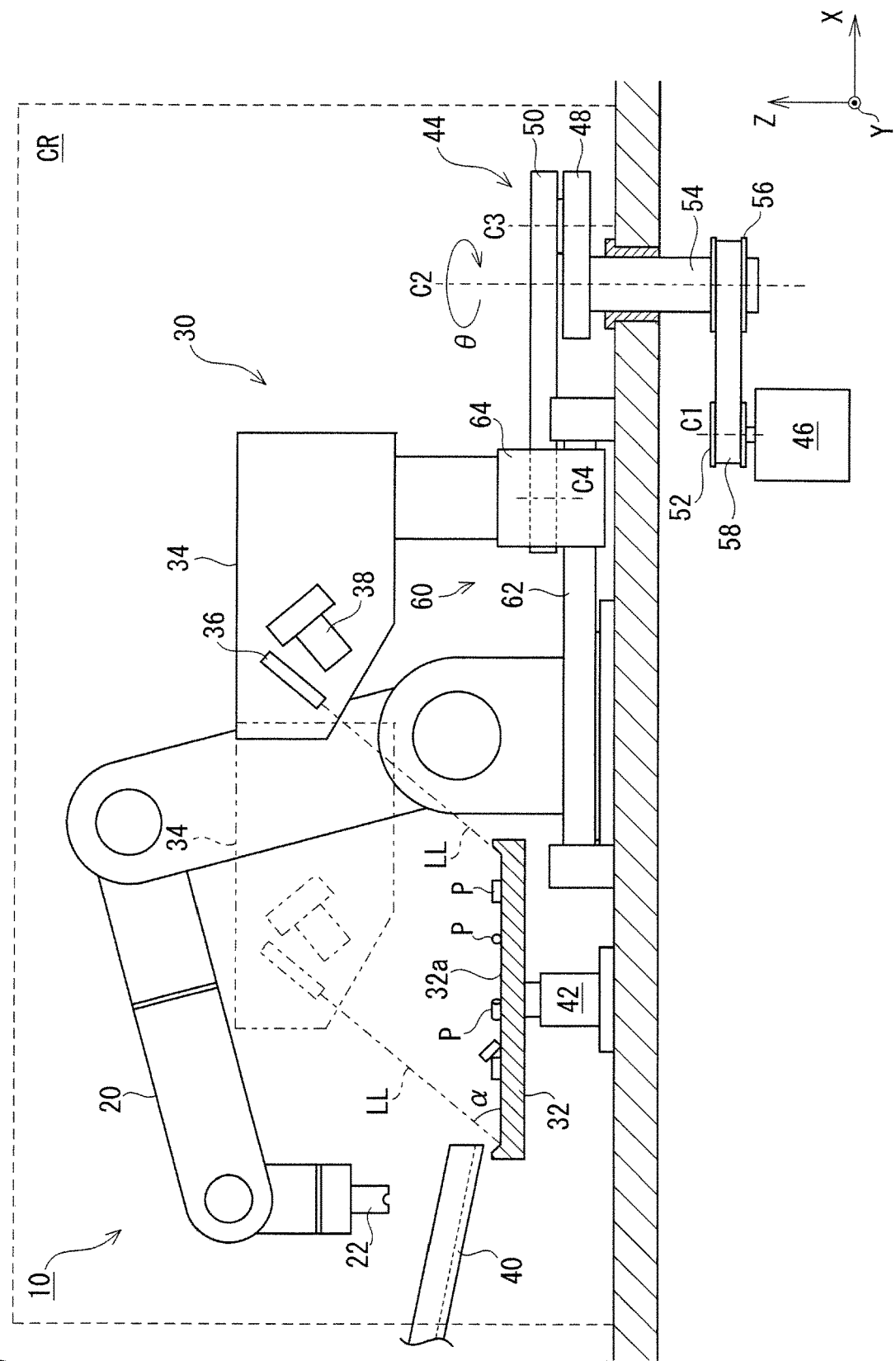
FIG. 1 is a schematic side view of a parts transfer system according to an embodiment of the present disclosure.

A parts supply device according to one aspect of the present disclosure includes a stage having a placement surface on which a plurality of parts is placed, an imaging system configured to image the plurality of parts from an obliquely upward direction with respect to the placement surface of the stage, and a parts detection unit configured to detect positions and orientations of the plurality of parts on the placement surface of the stage based on image information obtained by the imaging system.

According to such an aspect, it is possible to pick a part more reliably in a correct orientation.

For example, it is preferable that, in the parts supply device, the imaging system includes a line light emitting device configured to emit line light extending in a direction intersecting the obliquely upward direction toward the stage at a first angle that is acute with respect to the placement surface, and a line light imaging device configured to image the line light on the placement surface of the stage toward the stage at a second angle that is acute with respect to the placement surface of the stage. In this case, it is preferable that, the image information includes a height distribution on the placement surface of the stage obtained by scanning the placement surface with the line light emitted by the line light emitting device, imaging, by the line light imaging device, each of a plurality of lines of the line light resulting from the scanning, and calculating the height distribution based on a shape of each of the plurality of lines of the line light that is imaged.

For example, it is preferable that the parts supply device further includes a moving head. In this case, it is preferable that the imaging system is mounted on the moving head, and the moving head is configured to move relatively to and parallel to the placement surface of the stage in a direction intersecting a direction in which the line light extends.

For example, it is preferable that the parts supply device further includes a storage unit that stores part shape data indicating a three-dimensional shape of each of the plurality of parts. In this case, it is preferable that the parts detection unit is configured to detect the positions and postures of the plurality of parts on the placement surface based on the height distribution and the part shape data.

For example, it is preferable that the parts supply device further includes a parts count estimation unit configured to estimate a number of the plurality of parts on the placement surface based on an area of a region where the plurality of parts is present in the placement surface of the stage and a size of each of the plurality of parts, the area being calculated by the parts count estimation unit based on the height distribution and shape information of the plurality of parts.

For example, it is preferable that the parts supply device further includes a stage swing device configured to swing the stage.

For example, it is preferable that the plurality of parts each have a bottomed cylindrical shape.

For example, it is preferable that the placement surface of the stage includes a plurality of grooves that each engage with a portion of an outer peripheral surface of each of the plurality of parts, the plurality of grooves extending in a moving direction of the moving head.

For example, it is preferable that the parts supply device further includes a moving head driving device configured to move the moving head linearly close to or away from the stage. Furthermore, it is preferable that the moving head driving device includes a servomotor, a first link arm having a one end and the other end, the one end being connected to the servomotor, and a second link arm having a one end and the other end, the one end of the second link arm being connected to the other end of the first link arm, the other end of the second link arm being connected to the moving head.

For example, it is preferable that the line light imaging device is configured to image the line light every time the moving head moves by a constant movement amount, based on a rotation angle of the servomotor and a non-linear relationship obtained in advance between the rotation angle and a position of the moving head.

A parts transfer system according to another aspect of the present disclosure includes the parts supply device, and a transfer device configured to pick and transfer a part.

According to such an aspect, it is possible to pick a part more reliably in a correct orientation.

Hereinafter, an embodiment of the present disclosure will be described with reference to the drawings.

Figure 2:
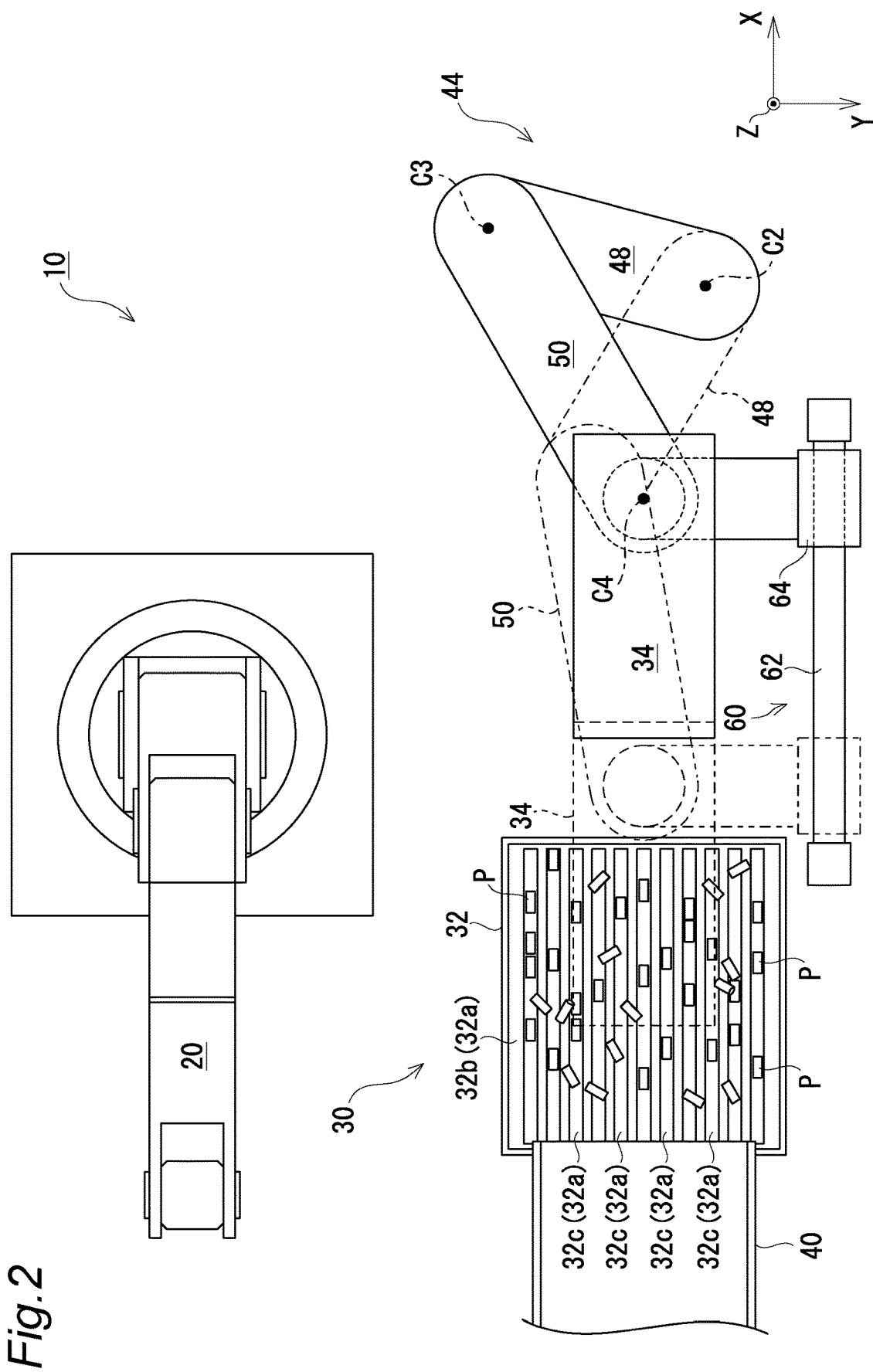
FIG. 2 is a schematic top view of the parts transfer system.
Figure 3:
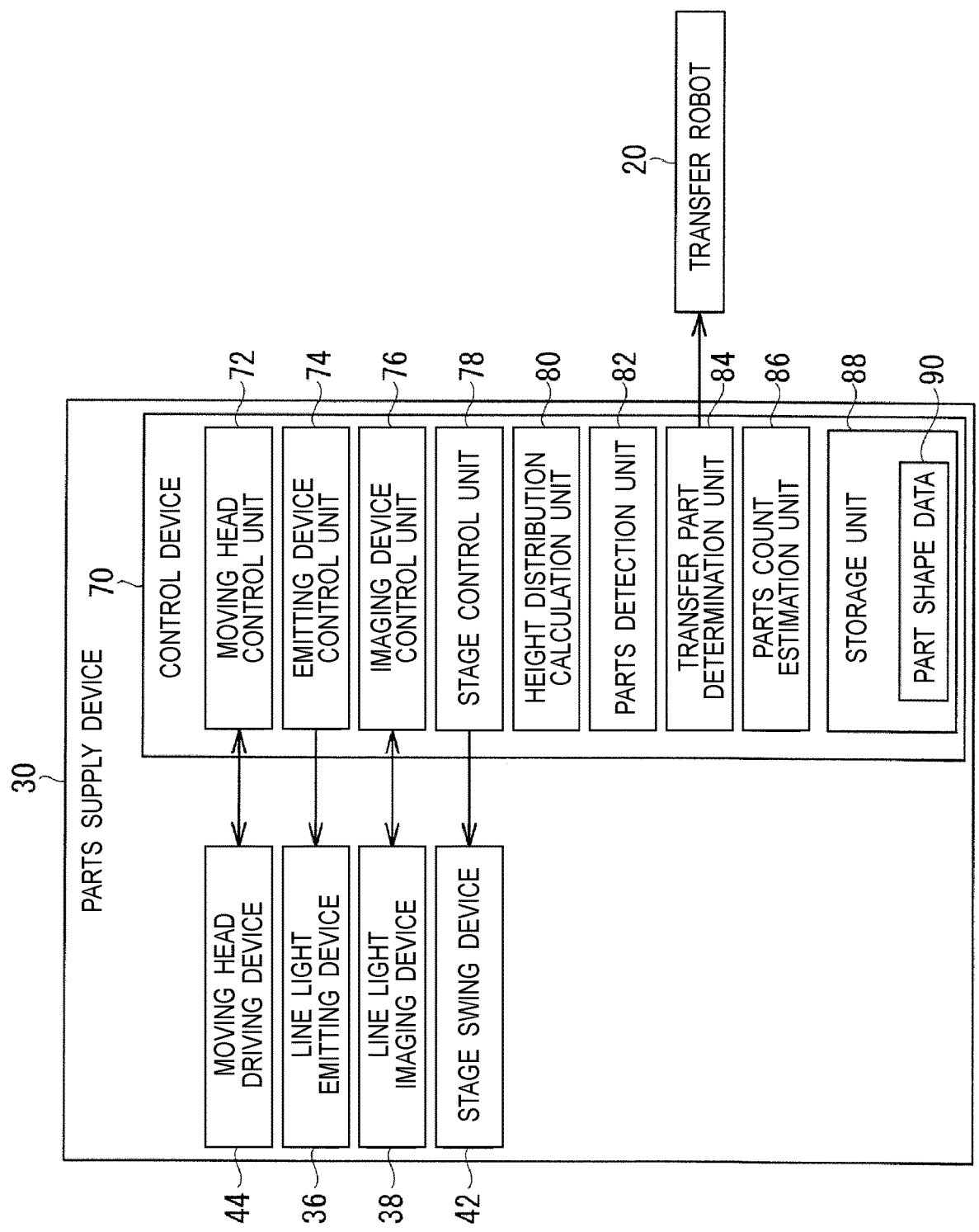
FIG. 3 is a block diagram illustrating a configuration of the parts transfer system.

FIG. 1 is a schematic side view of a parts transfer system according to an embodiment of the present disclosure. FIG. 2 is a schematic top view of the parts transfer system. FIG. 3 is a block diagram illustrating a configuration of the parts transfer system. Note that an X-Y-Z coordinate system illustrated in the drawings is provided to facilitate understanding of the present disclosure, and does not limit the embodiment of the present disclosure. In the X-Y-Z coordinate system, an X-axis direction and a Y-axis direction indicate horizontal directions, and a Z-axis direction indicates a vertical direction.

As illustrated in FIGS. 1 and 2, a parts transfer system 10 according to the present embodiment is a system for transferring parts P, and transfers the parts P in a clean room CR.

Figure 4:
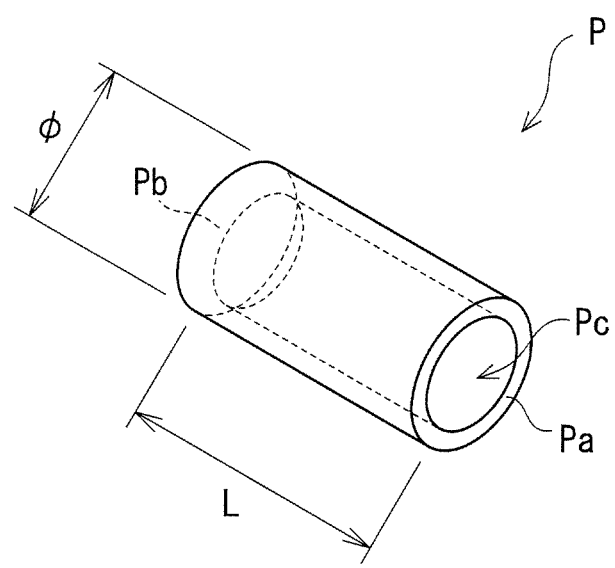
FIG. 4 is a perspective view of an example of a part handled by the parts transfer system.

FIG. 4 is a perspective view of an example of a part handled by the parts transfer system.

As illustrated in FIG. 4, in a case of the present embodiment, the parts transfer system 10 handles a part P having a bottomed cylindrical shape. Specifically, a part P has a cylindrical shape having a length L and an outer diameter φ, and includes a first end surface Pa and a second end surface Pb. The first end surface Pa has an opening Pc. On the other hand, the second end surface Pb has no opening.

As illustrated in FIGS. 1 and 2, in the case of the present embodiment, the parts transfer system 10 includes a transfer robot 20 as a transfer device that picks and transfers a part P, and a parts supply device 30 that supplies parts P to the transfer robot 20.

The transfer robot 20 of the parts transfer system 10 is an articulated robot that picks a part P, transfers the part P to a predetermined place (not illustrated), and places the part P in a predetermined orientation (for example, in a state where the opening Pc faces downward) on the predetermined place. In addition, the transfer robot 20 includes an end effector 22 for holding a part P. The end effector 14 is configured to suck and hold the part P, for example. In the present embodiment, the transfer robot 20 is a transfer robot for a clean environment suitable for use in the clean room CR.

The parts supply device 30 of the parts transfer system 10 is a device for supplying parts P to the transfer robot 20, and is configured to supply the parts P especially so that the transfer robot 20 can pick a part P.

For example, specifically, the parts supply device 30 includes a stage 32 having a placement surface 32a on which a plurality of parts P is placed, an imaging system that captures an image from an obliquely upward direction with respect to the parts P on the placement surface 32a of the stage 32, and a parts detection unit that detects positions and orientations of the parts P on the placement surface 32a of the stage 32 based on image information obtained by the imaging system. More specifically, the parts supply device 30 includes the stage 32 on which the plurality of parts P is placed, and a moving head 34 that moves relatively to the stage 32. The imaging system includes a line light emitting device 36 that emits line light on the stage 32, and a line light imaging device 38 that images the line light on the stage 32. The line light emitting device 36 and the line light imaging device 38 are mounted on the moving head 34.

The stage 32 includes the placement surface 32a spreading horizontally (parallel to the X-axis direction and the Y-axis direction) on which the plurality of parts P are placed. The transfer robot 20 picks a part P on the placement surface 32a. The parts P are carried into the clean room CR from the outside through a carry-in device 40, and are put on the placement surface 32a of the stage 32. At this time, the plurality of parts P is placed at random positions and in random orientations (postures).

In the case of the present embodiment, the placement surface 32a of the stage 32 includes a horizontal surface portion 32b and a plurality of grooves 32c formed in the horizontal surface portion 32b, the plurality of grooves 32c extending in a moving direction of the moving head 34 (X-axis direction). The grooves 32c each have a cross-sectional shape that allows a portion of an outer peripheral surface of a part P to engage so that the part P can be picked by the transfer robot 20. In the case of the present embodiment, substantially half of the part P engages with a groove 32c, and the remaining portion protrudes from the horizontal surface portion 32b. Furthermore, in the case of the present embodiment, the parts supply device 30 includes a stage swing device 42 such as an actuator that swings the stage 32 to change the positions and orientations of the plurality of parts P on the placement surface 32a. Roles of the grooves 32c and the stage swing device 42 will be described later.

The moving head 34 of the parts supply device 30 is a moving body having the line light emitting device 36 and the line light imaging device 38 for detecting the positions and orientations of the parts P on the placement surface 32a of the stage 32.

Specifically, the moving head 34 moves relatively to and parallel to the placement surface 32a of the stage 32 (in the X-axis direction). In the present embodiment, the moving head 34 moves close to or away from the stage 32 that does not move horizontally. When the moving head 34 is close to the stage 32, a portion of the moving head 34 is located above the placement surface 32a of the stage 32. Furthermore, the moving head 34 is driven by a moving head driving device 44.

As shown in FIGS. 1 and 2, in the case of the present embodiment, the moving head driving device 44 includes a servomotor 46, a first link arm 48, and a second link arm 50. The first link arm 48 has a one end and the other end, and the one end is connected to the servomotor 46. The second link arm 50 has a one end and the other end, the one end of the second link arm 50 is connected to the other end of the first link arm 48, and the other end of the second link arm 50 is connected to the moving head 34.

The servomotor 46 includes a timing pulley 52, and rotates the timing pulley 52 about a rotation center line C1 extending in the vertical direction (Z-axis direction). A drive shaft 54 extending in the vertical direction is attached to the one end of the first link arm 48. The drive shaft 54 is provided with a timing pulley 56. The timing pulley 56 is in drive connection with the timing pulley 52 of the servomotor 46 via a timing belt 58. This drive connection causes the drive shaft 54 to rotate about a rotation center line C2 extending in the vertical direction.

The one end of the second link arm 50 is connected to the other end of the first link arm 48 so as to be rotatable about a rotation center line C3 extending in the vertical direction (Z-axis direction). The other end of the second link arm 50 is connected to the moving head 34 so as to be rotatable about a rotation center line C4 extending in the vertical direction.

The servomotor 46, the timing pulleys 52 and 56, and the timing belt 58 are disposed outside the clean room CR, and the drive shaft 54 extends from the inside to the outside of the clean room CR.

According to the moving head driving device 44 described above, the servomotor 46 rotates the drive shaft 54 via the timing pulleys 52 and 56 and the timing belt 58. Consequently, the first and second link arms 48 and 50 drive the moving head 34. Such a drive connection allows the moving head 34 to move close to or away from the stage 32 by forward or backward rotation of the servomotor 46.

Note that there is provided a guide device 60 so that the moving head 34 driven by the moving head driving device 44 (servomotor 46 thereof) moves linearly close to or away from the stage 32. The guide device 60 includes a rail 62 extending in a horizontal direction (X-axis direction) and a guide block 64 that engages with the rail 62 and moves in the extending direction of the rail 62. This guide block 64, when attached to the moving head 34, allows for the linear movement of the moving head 34.

According to the moving head driving device 44 having such a configuration, a plurality of cables (power cable, signal cable, and the like) connected to the line light emitting device 36 and the line light imaging device 38 mounted on the moving head 34 can be led out to the outside of the clean room CR through the inside of the first and second link arms 48 and 50 and the drive shaft 54.

The line light emitting device 36 mounted on the moving head 34 emits line light on the stage 32.

Figure 5:
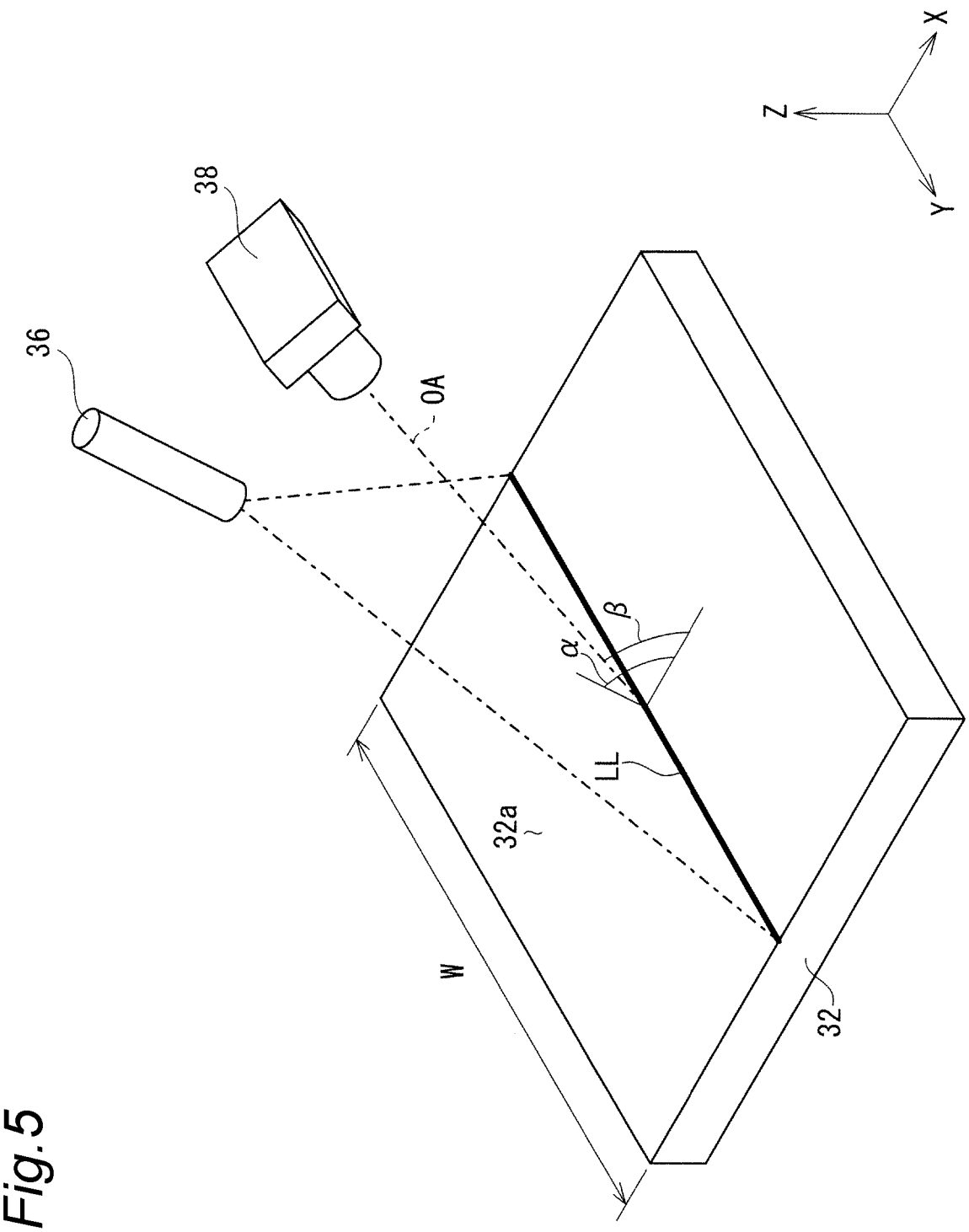
FIG. 5 is a perspective view illustrating line light emitted on a stage.

FIG. 5 is a perspective view illustrating line light LL emitted on the stage. Note that FIG. 5 shows the stage 32 schematically.

As illustrated in FIG. 5, the line light emitting device 36 is configured to emit the line light LL on the placement surface 32a of the stage 32. For example, the line light emitting device 36 is a laser device including a slit-shaped emission port.

Specifically, the line light emitting device 36 emits the line light LL extending in a direction (Y-axis direction) intersecting the imaging direction of the imaging system (obliquely upward direction with respect to the parts P on the placement surface 32a of the stage 32) or equivalently, in the case of the present embodiment, the moving direction of the moving head 34 (X-axis direction). A length (size in the Y-axis direction) of the line light LL is substantially equal to a width W of the placement surface 32a of the stage 32.

As illustrated in FIG. 1, the line light emitting device 36 emits the line light LL toward the stage 32 with respect to the moving head 34 at a first angle α that is acute with respect to the placement surface 32a of the stage 32. The first angle α is, for example, 60 degrees.

Then, when the moving head 34 moves with respect to the placement surface 32a of the stage 32, specifically, moves in the direction (X-axis direction) intersecting the extending direction of the line light LL (Y-axis direction), the line light LL moves on, that is, scans the placement surface 32a of the stage 32. Note that the moving head 34 and the placement surface 32a of the stage 32 are only required to move relatively to each other, and the placement surface 32a of the stage 32 may move with respect to the moving head 34.

The line light imaging device 38 mounted on the moving head 34 images the line light LL on the placement surface 32a of the stage 32.

Figure 6:
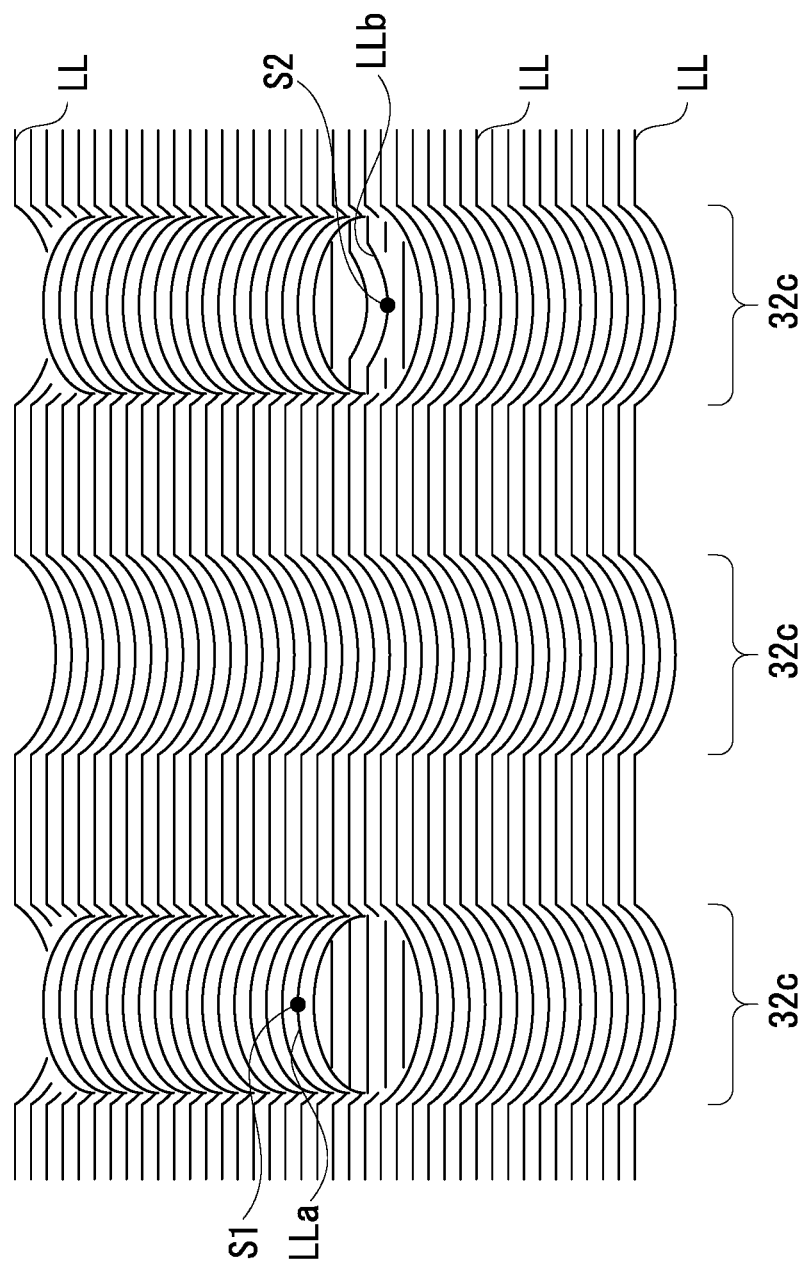
FIG. 6 is a diagram illustrating a plurality of lines of the line light on a portion of the placement surface of the stage imaged by the line light imaging device.
Figure 7:
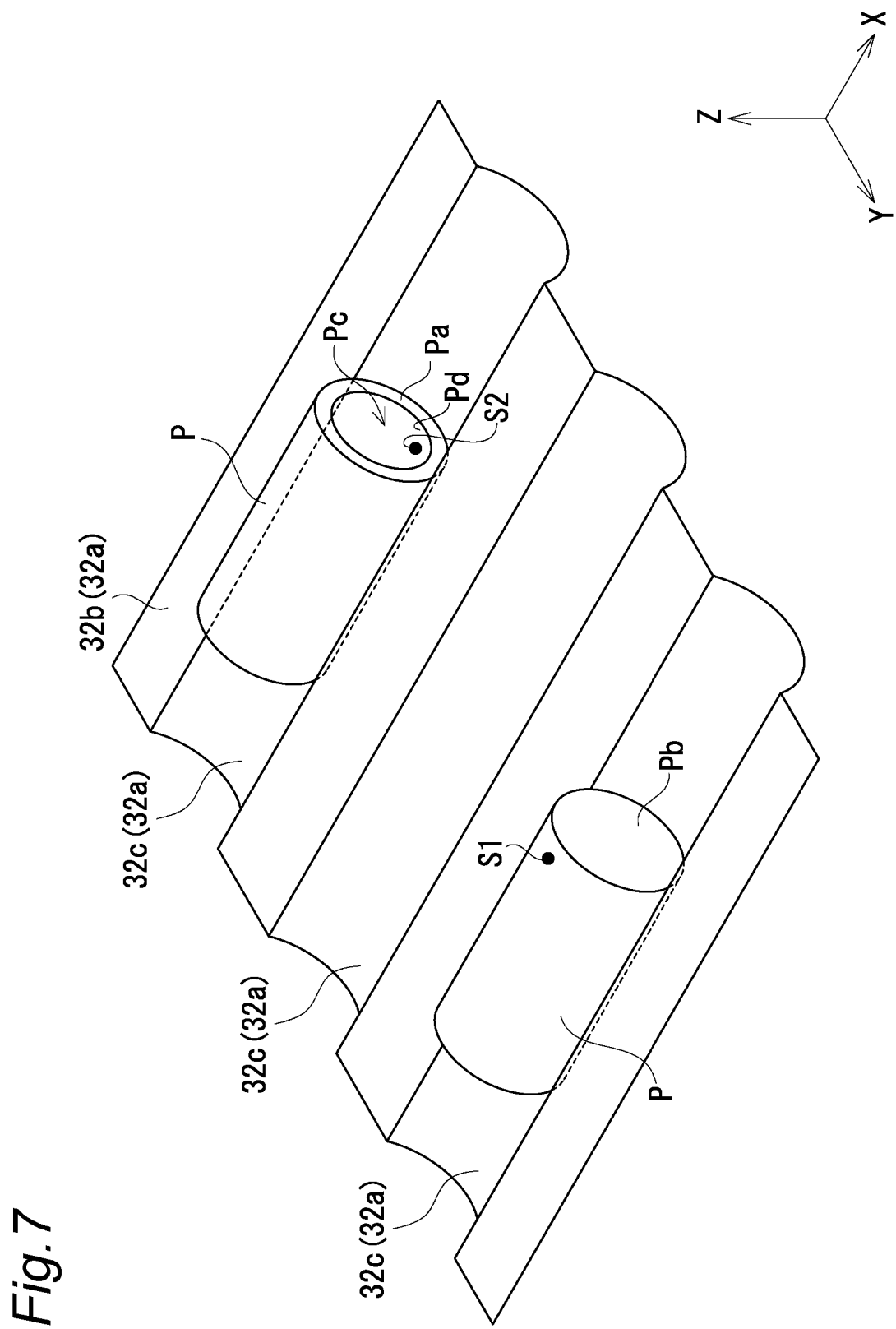
FIG. 7 is a perspective view of the portion of the placement surface of the stage on which the plurality of lines of the line light illustrated in FIG. 6 is emitted.

FIG. 6 is a diagram illustrating a plurality of lines of the line light LL on a portion of the placement surface of the stage imaged by the line light imaging device. Note that FIG. 6 illustrates the plurality of lines of the line light LL each imaged at a different timing. FIG. 7 is a perspective view of the portion of the placement surface of the stage on which the plurality of lines of the line light LL illustrated in FIG. 6 is emitted.

The line light imaging device 38 is, for example, a camera, and images the line light LL on the placement surface 32a of the stage 32 every time the moving head 34 moves by a predetermined constant distance. That is, reflected light of the line light LL is incident on a light receiving surface of an imaging element of the line light imaging device 38.

As illustrated in FIG. 5, the line light imaging device 38 images the line light LL on the stage 32 toward the stage 32 with respect to the moving head 34 at a second angle β that is acute with respect to the placement surface 32a of the stage 32. That is, an optical axis OA of the line light imaging device 38 intersects the stage 32 at the second angle β. The second angle β is 45 degrees. The second angle β is preferably closer to the first angle α, and may be equal to the first angle α.

As illustrated in FIGS. 6 and 7, a shape of a line of the line light LL imaged by the line light imaging device 38 corresponds to a surface shape of a portion of an object (the placement surface 32a of the stage 32 or a part P) on which the line of the line light LL is emitted. That is, the shape of the line of the line light LL represents a height distribution of the portion of the object on which the line of the line light LL is emitted. For example, the height distribution is represented with a bottommost portion of the grooves 32c as a reference (Z=0). Therefore, the height distribution on the entire placement surface 32a of the stage 32 can be obtained from the shape of each of the plurality of lines of the line light LL imaged by the line light imaging device 38 during the movement of the moving head 34.

As illustrated in FIG. 3, the parts transfer system 10 includes a control device 70.

The control device 70 is configured to control the moving head driving device 44, the line light emitting device 36, the line light imaging device 38, and the stage swing device 42, to supply parts P so that the transfer robot 20 can pick a part P. Thus, the control device 70 is configured to detect the positions and orientations of the plurality of parts P placed on the placement surface 32a of the stage 32.

Specifically, the control device 70 includes a moving head control unit 72 that controls the moving head driving device 44, an emitting device control unit 74 that controls the line light emitting device 36, an imaging device control unit 76 that controls the line light imaging device 38, a stage control unit 78 that controls the stage swing device 42, a height distribution calculation unit 80 that calculates the height distribution on the entire placement surface 32a of the stage 32, a parts detection unit 82 that detects the positions and orientations of the parts P on the placement surface 32a based on the calculated height distribution, a transfer part determination unit 84 that determines a part to be picked and transferred by the transfer robot 20, a parts count estimation unit 86 that estimates the number of the parts P on the placement surface 32a of the stage 32, and a storage unit 88 such as a hard disk.

The control device 70 includes, for example, a CPU and a storage device such as a memory and a hard disk. The CPU functions as the moving head control unit 72, the emitting device control unit 74, the imaging device control unit 76, the stage control unit 78, the height distribution calculation unit 80, the parts detection unit 82, the transfer part determination unit 84, and the parts count estimation unit 86 by operating in accordance with a program stored in the storage device (storage unit 88).

In order to detect the positions and orientations of the plurality of parts P placed on the placement surface 32a of the stage 32, the moving head control unit 72 controls the moving head driving device 44 to move the moving head 34. Thus, the moving head control unit 72 controls the servomotor 46 of the moving head driving device 44 to control a moving speed and a position of the moving head 34. Specifically, a rotation angle θ of the servomotor 46 is controlled based on a signal from an encoder mounted on the servomotor 46. The moving speed and the position of the moving head 34 are controlled by controlling the rotation angle θ.

In the case of the present embodiment, as illustrated in FIGS. 1 and 2, the servomotor 46 is in drive connection with the moving head 34 via a link mechanism unit including the first link arm 48 and the second link arm 50. Thus, the rotation angle θ of the servomotor 46 and the position of the moving head 34 are not in a linear relationship.

Figure 8:
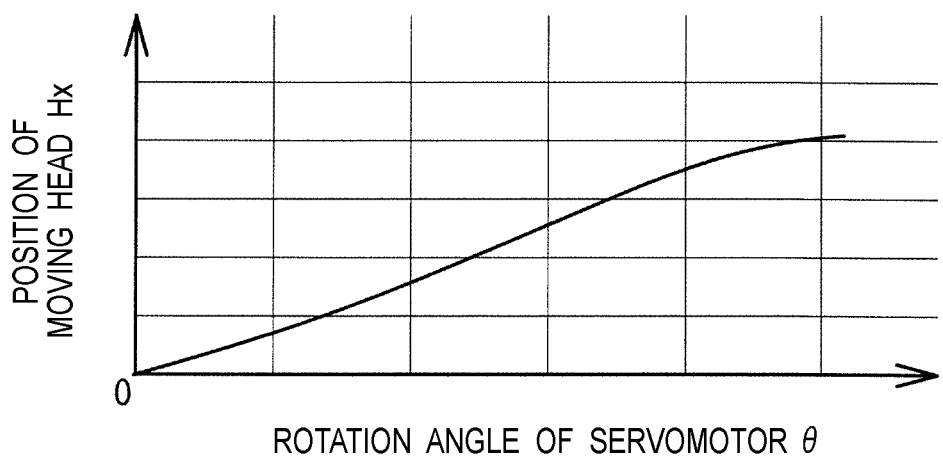
FIG. 8 is a graph illustrating a relationship between a rotation angle of a servomotor and a position of a moving head.

FIG. 8 is a graph illustrating a relationship between the rotation angle of the servomotor and the position of the moving head.

As illustrated in FIG. 8, the position Hx (position in the X-axis direction) of the moving head 34 does not change linearly but changes non-linearly with respect to a change in the rotation angle θ of the servomotor 46. When the moving head 34 is located at a standby position farthest away from the stage 32 (position indicated by the solid line in FIGS. 1 and 2), the position Hx and the rotation angle θ are 0. Thus, the moving head control unit 72 controls the moving speed and the position of the moving head 34 based on the rotation angle θ acquired from the encoder of the servomotor 46 and the non-linear relationship obtained in advance as illustrated in FIG. 8.

The emitting device control unit 74 in the control device 70 activates the line light emitting device 36 for detecting the positions and orientations of the plurality parts P placed on the placement surface 32a of the stage 32. This causes the line light emitting device 36 to continuously emit the line light LL. As a result, when the moving head 34 moves, the line light LL moves on the placement surface 32a of the stage 32. Upon completion of detecting the positions and orientations of the parts P, the emitting device control unit 74 stops the line light emitting device 36 (the emission of the line light LL stops).

The imaging device control unit 76 in the control device 70 controls the line light imaging device 38 to cause the line light imaging device 38 to image the line light LL on the stage 32 every time the moving head 34 moves by the constant movement amount. A timing at which the moving head 34 has moved by the constant movement amount can be obtained based on the rotation angle α of the servomotor 46 and on the non-linear relationship obtained in advance between the rotation angle θ of the servomotor 46 and the position Hx of the moving head 34 as illustrated in FIG. 8. More specifically, for example, the control device 70 takes in encoder pulse information from the link drive servomotor 46, corrects timing on the basis of a conversion table between the drive shaft rotation amount of the link mechanism unit and the horizontal movement amount of the line light imaging device 38 held in the storage unit 88, and outputs an imaging trigger at the corrected timing to the line light imaging device 38. The control device 70 acquires, from the line light imaging device 38, scan data (that is, a plurality of pieces of line light image data) resulting from imaging the line light according to the imaging trigger. In this way, as illustrated in FIG. 6, it is possible to image the plurality of lines of the line light LL emitted to a plurality of different positions of the placement surface 32a of the stage 32, that is, positions at regular intervals corresponding to the constant movement amount of the moving head 34.

The stage control unit 78 in the control device 70 controls the stage swing device 42 illustrated in FIG. 1 to swing the stage 32 at a predetermined timing. This results in a change in the positions and orientations of the plurality of parts P on the placement surface 32a of the stage 32. In the case of the present embodiment, swinging the stage 32 causes some of the parts P to engage partially in the grooves 32c of the placement surface 32a. As a result, the openings Pc of the some of the parts P face the moving head 34 or an opposite direction thereof.

The predetermined timing at which the stage control unit 78 causes the stage swing device 42 to swing the stage 32 is, for example, a timing at which the carry-in device 40 illustrated in FIGS. 1 and 2 carries in (puts) the plurality of parts P on the placement surface 32a of the stage 32. Swinging the stage 32 at this timing leads to spreading the plurality of parts P, which is carried in via the carry-in device 40 and piled up on the placement surface 32a, over the entire placement surface 32a. Another predetermined timing will be described later.

As illustrated in FIG. 6, the height distribution calculation unit 80 in the control device 70 calculates the height distribution on the placement surface 32a of the stage 32 based on the shapes of the plurality of lines of the line light LL imaged by the line light imaging device 38. For example, the height distribution is calculated with the bottommost portion of the grooves 32c of the placement surface 32a as a reference (Z=0).

The parts detection unit 82 in the control device 70 detects the positions and orientations of the parts P on the placement surface 32a of the stage 32 based on the height distribution calculated by the distribution calculation unit 80.

Specifically, in the case of the present embodiment, the storage unit 88 stores in advance information of the outer diameter φ and the length L of the parts P. The positions of the parts P are detected based on such size information and the height distribution. For example, as illustrated in FIG. 6, a point S1 on a portion LLa of a line of the line light LL emitted on the outer peripheral surface of a part P has a height substantially equal to the outer diameter φ of the parts P. A region of the height distribution in which this height is distributed on a straight line having substantially the same length as the length L of the parts P (corresponding region in the placement surface 32a of the stage 32) is detected as the position of the part P. In the case of the present embodiment, since the reference of the height is the bottommost portion of the grooves 32c, parts P engaging in the grooves 32c are detected.

In the case of the present embodiment, the storage unit 88 stores in advance information of a thickness (distance between an outer peripheral surface and an inner peripheral surface) of the parts P. The orientations of the parts P are detected based on such thickness information and the height distribution. For example, as illustrated in FIG. 6, a point S2 on a portion LLb of a line of the line light LL emitted on the inner peripheral surface Pd of a part P has a height substantially equal to the thickness of the parts P since the bottommost portion of the grooves 32c is zero. Based on this height distribution, the orientation of the part P, that is, the orientation of the opening Pc is detected.

As described above and illustrated in FIG. 5, the detection of the orientation of the opening Pc is realized by the line light emitting device 36 emitting the line light LL at the first angle α that is acute with respect to the placement surface 32a of the stage 32. That is, the orientation detection is realized by emitting the line light LL on the inner peripheral surface of the part P. In addition, the orientation detection is realized by the line light imaging device 38 capturing an image at the second angle β that is acute with respect to the placement surface 32a of the stage 32. That is, the orientation detection is realized by imaging the inner peripheral surface of the part P.

In order to detect the positions and orientations of the parts P with high accuracy based on the height distribution, the parts detection unit 82 may use part shape data 90 indicating a three-dimensional shape of the parts P, such as 3D-CAD data or point cloud data. The height distribution indicates a surface shape of an object on the placement surface 32a of the stage 32. When a portion of the surface shape substantially coincides with a surface shape in the 3D-CAD data or a plurality of points in the point cloud data, it can be determined with high accuracy that the portion corresponds to the surface of a part P. As a result, the position and orientation of the part P can be detected with high accuracy. In this case, the storage unit 88 stores the part shape data 90 of the parts P.

The transfer part determination unit 84 in the control device 70 determines a part P to be transferred by the transfer robot 20 from among parts P whose positions and orientations have been detected by the parts detection unit 84.

Specifically, the transfer robot 20 may fail to pick a part P out of parts P in contact with each other or overlapping with each other. Thus, in the case of the present embodiment, the transfer part determination unit 84 determines, as a transfer target part, a part P that can be picked in the same posture by the end effector 22 of the transfer robot 20, that is, a part P on a groove 32c of the placement surface 32a of the stage 32. Then, information on the position and orientation of the determined part P is transmitted to the transfer robot 20. As a result, the transfer robot 20 can pick the part P in a correct orientation.

In a case where the transfer robot 20 is configured to distinguish a part P that can be picked based on the information on the positions and orientations of the plurality of parts P, it is possible to omit the transfer part determination unit 84 and the grooves 32c of the stage 32.

The parts count estimation unit 86 of the control device 70 estimates the number of the parts P on the placement surface 32a of the stage 32.

In the case of the present embodiment, the carry-in device 40 puts an arbitrary number of parts P on the placement surface 32a of the stage 32. Thus, the parts count estimation unit 86 estimates the number of the parts P on the placement surface 32a. Specifically, the parts count estimation unit 86 estimates the number of the parts P based on the height distribution calculated by the height distribution calculation unit 80.

First, the parts count estimation unit 86 calculates the area of a region where the parts P are present in the placement surface 32a of the stage 32 based on the height distribution and shape information of the parts P. In the case of the present embodiment, since the parts P have the cylindrical shape, a height larger than half of the outer diameter φ or the length L, which is a portion of the shape information, is distributed in a region in the placement surface 32a of the stage 32. Such a region is specified and the area thereof is calculated. Note that, in the case of the present embodiment, since the placement surface 32a has the plurality of grooves 32c that each engages with half of a part P, the area of a region higher than the horizontal surface portion 32b of the placement surface 32a is calculated. Next, the parts count estimation unit 86 calculates the number of the parts P based on the calculated area and a size of the parts P. For example, the approximate number of the parts P can be calculated by dividing the calculated area by an average cross-sectional area of the parts P.

Information on the number of the parts P estimated by the parts count estimation unit 86 is used for various purposes.

For example, before the transfer robot 20 starts transferring the plurality of parts P on the stage 32, the parts count estimation unit 86 estimates the number of the parts P. The number of parts P remaining on the stage 32 can be checked by using the estimated number of the parts P and the number of parts P having been transferred by the transfer robot 20.

For example, when the number of parts P remaining on the stage 32 is a predetermined number or less, a new plurality of parts P is put on the placement surface 32a of the stage 32. As a result, the transfer robot 20 can continue parts transfer at a high utilization rate. For example, when the transfer part determination unit 84 fails to determine a part P to be transferred despite the sufficiently large number of parts P remaining on the stage 32, the stage control unit 78 swings the stage 32. This causes a change in the positions and orientations of the parts P remaining on the stage 32 so that the transfer robot 20 can pick a part P.

Hereinafter, a flow of a parts transfer operation in the parts transfer system 10 will be described.

Figure 9:
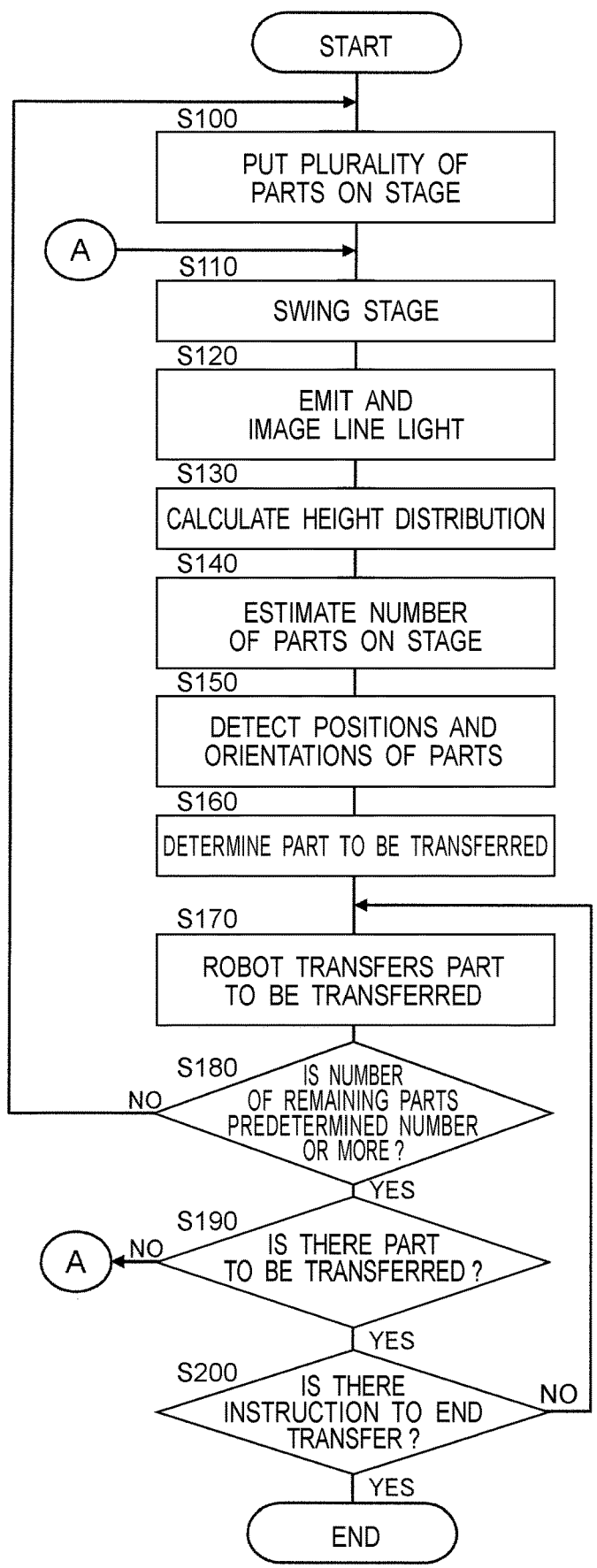
FIG. 9 is a flowchart illustrating an example of a flow of a parts transfer operation in the parts transfer system.

FIG. 9 is a flowchart illustrating an example of the flow of the parts transfer operation in the parts transfer system.

As illustrated in FIG. 9, first, in step S100, the carry-in device 40 carries in (puts) a plurality of parts P on the placement surface 32a of the stage 32 as illustrated in FIGS. 1 and 2.

Next, in step S110, the stage control unit 78 of the control device 70 causes the stage swing device 42 to swing the stage 32. As a result, the plurality of parts P put and piled up in step S100 are spread over the entire placement surface 32a of the stage 32.

Subsequently, in step S120, the moving head control unit 72 of the control device 70 causes the moving head driving device 44 to move the moving head 34. Along with the movement of the moving head 34, the emitting device control unit 74 causes the line light emitting device 36 to emit the line light LL on the placement surface 32a of the stage 32, and the imaging device control unit 76 causes the line light imaging device 38 to image the line light LL on the placement surface 32a of the stage 32.

In step S130, the height distribution calculation unit 80 of the control device 70 calculates the height distribution on the placement surface 32a of the stage 32 based on the shape of each of a plurality of lines of the line light LL imaged by the line light imaging device 38 in step S120.

In step S140, the parts count estimation unit 86 of the control device 70 estimates the number of the parts P on the placement surface 32a of the stage 32 based on the height distribution calculated in step S130.

In step S150, the parts detection unit 82 of the control device 70 detects the positions and orientations of the parts P on the placement surface 32a of the stage 32 based on the height distribution calculated in step 130.

In step S160, the transfer part determination unit 84 of the control device 70 determines a part P to be transferred by the transfer robot 20 as a transfer target from among parts P whose positions and orientations have been detected in step S150.

In step S170, the transfer robot 20 picks the part P determined as the transfer target in step S160, and transfers the part P to a predetermined place.

After the transfer robot 20 transfers the part P in step S170, it is determined, in step S180, whether the number of parts P remaining on the stage 32 is a predetermined number or more. When the number of parts P remaining on the stage 32 is the predetermined number or more, the process proceeds to step S190. Otherwise, the process returns to step S100.

In step S190, it is determined whether a part P to be transferred is present among the parts P remaining on the stage 32. When a part P to be transferred is present on the stage 32, the process proceeds to step S200. Otherwise, the process returns to step S110.

In step S200, it is determined whether there is an instruction to end transferring the parts P. When there is an instruction to end transferring the parts P, the parts transfer ends. Otherwise, the process returns to step S170.

As described above, according to the present embodiment, a part can be picked in a correct orientation in the parts transfer of picking and transferring a part.

The present disclosure has been described above with reference to the embodiment. However, the present disclosure is not limited to the above embodiment.

For example, in the above embodiment, the placement surface 32a is scanned with the line light LL emitted by the line light emitting device 36, each of the plurality of lines of the line light LL resulting from the scanning is imaged by the line light imaging device 38, and the height distribution on the placement surface 32a of the stage 32 is calculated based on the shape of each of the plurality of lines of the line light LL that is imaged. In the configuration illustrated as a means for this, there are included the stage 32 on which the plurality of parts P is placed, and the moving head 34 that moves relatively to the stage 32. The line light emitting device 36 and the line light imaging device 38 are mounted on the moving head 34, and the moving head 34 moves relatively to and parallel to the placement surface 32a of the stage 32. However, the present disclosure is not limited to this configuration.

For example, the "movement" may be non-parallel, that is, may cause a change in the space (distance) between the moving head 34 and the placement surface 32a of the stage 32. In such a case, for example, when the line light imaging device 38 images the line light LL emitted on the placement surface 32a, the space (distance) between an imaged portion of the placement surface 32a and the line light imaging device 38 is also acquired by some means. Then, the acquired space (distance) is used as correction data for calculating the height distribution on the placement surface 32a of the stage 32 based on the shape of each of the plurality of lines of the line light LL that is imaged.

Furthermore, for example, the movement is not limited to parallel/non-parallel movement, and may not be involved. Specifically, a mode in which the line light emitting device 36 and/or the line light imaging device 38 are fixed can be shown as an example. In this mode, for example, controlling only fixed angles thereof achieves position movement (scanning) of the line light LL on the placement surface 32a and, as necessary, following the movement (scanning) of the line light LL, a change in an imaging position of the line light imaging device 38. In such a case, imaging conditions and the like may also be appropriately acquired and used as correction data for calculating the height distribution on the placement surface 32a of the stage 32 based on the shape of each of the plurality of lines of the line light that is imaged.

Furthermore, for example, in the case of the above embodiment, as illustrated in FIG. 4, the parts to be transferred have the bottomed cylindrical shape. However, the embodiment of the present disclosure is not limited thereto, and can be applied to parts having various shapes.

Furthermore, for example, in the case of the above embodiment, the transfer device that picks and transfers a part is the articulated robot including the end effector that sucks and holds the part, but the embodiment of the present disclosure is not limited thereto. The transfer device is not limited in form to the articulated robot as long as a part placed on the stage can be picked and transferred.

That is, in a broad sense, a parts transfer system according to an embodiment of the present disclosure includes a stage having a placement surface on which a plurality of parts is placed, an imaging system configured to image the plurality of parts from an obliquely upward direction with respect to the placement surface of the stage, and a parts detection unit configured to detect positions and orientations of the plurality of parts on the placement surface of the stage based on image information obtained by the imaging system.

In a broad sense, a parts supply system according to another embodiment of the present disclosure includes the parts supply device according to another aspect of the present disclosure and a transfer device configured to pick and transfer a part.

INDUSTRIAL APPLICABILITY

The present disclosure is applicable to parts transfer using a transfer device such as a transfer robot that picks and transfers a part.

The invention claimed is:

1. A parts supply device comprising:
a stage having a placement surface on which a plurality of parts is placed;
an imaging system configured to image the plurality of parts from an obliquely upward direction with respect to the placement surface of the stage;
a parts detection unit configured to detect positions and orientations of the plurality of parts on the placement surface of the stage based on image information obtained by the imaging system;
a transfer part determination unit configured to determine a part that meets a given condition as a pick-able transfer target part based on the positions and orientations of the plurality of parts, from parts whose positions and orientations are detected by the parts detection unit; and
a moving head on which the imaging system is mounted, wherein the imaging system comprises:
a line light emitting device configured to emit line light extending in a direction intersecting the obliquely upward direction toward the placement surface of the stage from the moving head at a first angle that is acute with respect to the placement surface; and
a line light imaging device configured to image the line light on the placement surface of the stage toward the placement surface of the stage from the moving head at a second angle that is acute with respect to the placement surface of the stage,
wherein the image information includes a height distribution based on a height of the placement surface of the stage and across the entire placement surface, the height distribution being obtained by:
scanning the placement surface with the line light emitted by the line light emitting device;
imaging, by the line light imaging device, each of a plurality of lines of the line light resulting from the scanning; and
calculating the height distribution based on a shape of each of the plurality of lines of the line light that is imaged,
wherein the moving head is configured to move relatively to and parallel to the placement surface of the stage in a direction intersecting a direction in which the line light extends,
wherein the line light emitting device and the line light imaging device are mounted on the moving head such that both the line light emitting device and the line light imaging device are on one side of the line light as viewed from above the placement surface of the stage,
wherein the transfer part determination unit is configured to determine a part orienting in a given direction as the pick-able transfer target part from among parts whose positions and orientations are detected by the parts detection unit,
wherein each of the plurality of parts is a part having an opening at one end,
wherein the line light emitting device is configured to emit the line light at the first angle with respect to the placement surface of the stage such that the line light is emitted on an inner peripheral surface of the part having the opening orienting in a horizontal direction,
wherein the line light imaging device is configured to image the line light on the placement surface of the stage at the second angle such that the inner peripheral surface of the part is imaged, and
wherein the transfer part determination unit is configured to determine a part having the opening orienting in the given direction as the pick-able transfer target part from among parts whose positions and orientations are detected by the parts detection unit.

2. The parts supply device according to claim 1, further comprising a storage unit that stores part shape data indicating a three-dimensional shape of each of the plurality of parts, wherein
the parts detection unit is configured to detect the positions and orientations of the plurality of parts on the placement surface based on the height distribution and the part shape data.

3. The parts supply device according to claim 1, further comprising a parts count estimation unit configured to estimate a number of the plurality of parts on the placement surface based on an area of a region where the plurality of parts is present in the placement surface of the stage and a size of each of the plurality of parts, the area being calculated by the parts count estimation unit based on the height distribution and shape information of the plurality of parts.

4. The parts supply device according to claim 1, further comprising a stage swing device configured to swing the stage so as to change the positions and orientations of the plurality of parts on the placement surface of the stage.

5. The parts supply device according to claim 4, wherein the plurality of parts each has a bottomed cylindrical shape, and
wherein the placement surface of the stage comprises a plurality of grooves that each engages with a portion of an outer peripheral surface of each of the plurality of parts, the plurality of grooves extending in a moving direction of the moving head.

6. The parts supply device according to claim 1, further comprising a moving head driving device configured to move the moving head linearly close to or away from the stage, wherein
the moving head driving device comprises:
a servomotor;
a first link arm having a one end and the other end, the one end being connected to the servomotor; and
a second link arm having a one end and the other end, the one end of the second link arm being connected to the other end of the first link arm, the other end of the second link arm being connected to the moving head.

7. The parts supply device according to claim 6, wherein the line light imaging device is configured to image the line light every time the moving head moves by a constant movement amount, and
wherein the servomotor rotates the first link arm at a rotation amount corresponding to the constant movement amount of the moving head and calculated based on a non-linear relationship obtained in advance between the rotation angle of the servomotor and a position of the moving head.

8. A parts transfer system comprising:
the parts supply device according to claim 1; and
a transfer device configured to pick and transfer a part, wherein the transfer device is configured to pick the part in the given direction.

9. The parts supply device according to claim 1, further comprising:
a stage swing device configured to swing the stage,
wherein when the transfer part determination unit cannot determine the pick-able transfer target part, the stage swing device swings the stage so that the positions and orientations of the parts on the placement surface of the stage are changed.

10. The parts transfer system according to claim 8, wherein the transfer device is a transfer robot having an end effector, and
wherein the transfer part determination unit is configured to determine a part that enables to be picked in a same posture by the end effector and that orients in the given direction, from parts whose positions and orientations are detected by the parts detection unit, as the pick-able transfer target part.

11. The parts supply device according to claim 1, wherein the plurality of parts each has a bottomed cylindrical shape,
wherein the placement surface of the stage comprises a plurality of grooves that each engages with a portion of an outer peripheral surface of each of the plurality of parts, the plurality of grooves extending in a moving direction of the moving head,
wherein the height distribution includes a height distribution based on a height of a bottommost portion of the grooves, and
wherein the transfer part determination unit is configured to determine a part positioned on the grooves and having the opening oriented in the given direction as the pick-able transfer target part, from among parts whose positions and orientations are detected by the parts detection unit.

12. The parts supply device according to claim 1, further comprising a storage unit configured to store information of a thickness of the parts,
wherein the parts detection unit is configured to detect orientations of the openings of the plurality of parts on the placement surface of the stage based on information of the thickness of the parts stored in the storage unit and the height distribution.

13. The parts supply device according to claim 4, wherein the stage is a stage unremovable in a horizontal direction.

14. The parts supply device according to claim 10,
wherein the line light imaging device is configured to image the line light on the placement surface of the stage at the second angle such that the inner peripheral surface of the part is imaged, and
wherein the transfer part determination unit is configured to determine a part that enables to be picked in the same posture by the end effector and that has the opening orienting in the given direction, from among parts whose positions and orientations are detected by the parts detection unit, as the pick-able transfer target part.

15. The part supply device according to claim 1, wherein the transfer part determination unit is configured to determine the given direction in which the part orients, and to determine the part orienting in the given direction as the pick-able transfer target part from among parts whose positions and orientations are detected by the parts detection unit.

16. The part supply device according to claim 1, wherein the given direction is a direction towards the moving head.

17. A parts transfer system comprising:
the parts supply device according to claim 16; and
a transfer device configured to pick and transfer a part, wherein the transfer device is configured to pick the part in the given direction.

18. A parts supply device comprising:
a stage having a placement surface on which a plurality of parts is placed;
an imaging system configured to image the plurality of parts from an obliquely upward direction with respect to the placement surface of the stage;
a parts detection unit configured to detect positions and orientations of the plurality of parts on the placement surface of the stage based on image information obtained by the imaging system;
a transfer part determination unit configured to determine a part that meets a given condition as a pick-able transfer target part based on the positions and orientations of the plurality of parts, from parts whose positions and orientations are detected by the parts detection unit; and
a moving head on which the imaging system is mounted,
wherein the imaging system comprises:
a line light emitting device configured to emit line light extending in a direction intersecting the obliquely upward direction toward the placement surface of the stage from the moving head at a first angle that is acute with respect to the placement surface; and
a line light imaging device configured to image the line light on the placement surface of the stage toward the placement surface of the stage from the moving head at a second angle that is acute with respect to the placement surface of the stage,
wherein the image information includes a height distribution based on a height of the placement surface of the stage and across the entire placement surface, the height distribution being obtained by:
scanning the placement surface with the line light emitted by the line light emitting device;
imaging, by the line light imaging device, each of a plurality of lines of the line light resulting from the scanning; and
calculating the height distribution based on a shape of each of the plurality of lines of the line light that is imaged,
wherein the moving head is configured to move relatively to and parallel to the placement surface of the stage in a direction intersecting a direction in which the line light extends,
wherein the line light emitting device and the line light imaging device are mounted on the moving head such that both the line light emitting device and the line light imaging device are on one side of the line light as viewed from above the placement surface of the stage,
wherein the transfer part determination unit is configured to determine a part orienting in a given direction as the pick-able transfer target part from among parts whose positions and orientations are detected by the parts detection unit,
wherein the placement surface of the stage comprises a plurality of grooves that each engages with a portion of an outer peripheral surface of each of the plurality of parts, the plurality of grooves extending in a moving direction of the moving head, and
wherein the given direction is one direction parallel to extending directions of the grooves.

19. A parts transfer system comprising:
the parts supply device according to claim 18; and
a transfer device configured to pick and transfer a part, wherein the transfer device is configured to pick the part in the given direction.

* * * * *